US011068568B2

(12) United States Patent
Giatilis et al.

(10) Patent No.: US 11,068,568 B2
(45) Date of Patent: Jul. 20, 2021

(54) METHOD AND SYSTEM FOR INITIATING A LOGIN OF A USER

(71) Applicant: RingCentral, Inc., Belmont, CA (US)

(72) Inventors: Vasileios Giatilis, Palaio Faliro (GR); Labros Pappas, Iraklio (GR)

(73) Assignee: RingCentral, Inc., Belmont, CA (US)

( * ) Notice: Subject to any disclaimer, the term of this patent is extended or adjusted under 35 U.S.C. 154(b) by 35 days.

(21) Appl. No.: 16/506,076

(22) Filed: Jul. 9, 2019

(65) Prior Publication Data

US 2019/0332748 A1     Oct. 31, 2019

Related U.S. Application Data

(63) Continuation of application No. 15/325,559, filed as application No. PCT/EP2015/001334 on Jul. 1, 2015, now Pat. No. 10,395,014.

(30) Foreign Application Priority Data

Jul. 11, 2014  (EP) .................................... 14002411

(51) Int. Cl.
  *H04L 29/06*  (2006.01)
  *G06F 21/31*  (2013.01)
  *G06F 21/46*  (2013.01)

(52) U.S. Cl.
  CPC .............. *G06F 21/31* (2013.01); *G06F 21/46* (2013.01); *G06F 2221/031* (2013.01)

(58) Field of Classification Search
  CPC ..... G06F 21/31; G06F 21/46; G06F 2221/031
  See application file for complete search history.

(56) References Cited

U.S. PATENT DOCUMENTS 6,493,464 B1 * 12/2002 Hawkins ............ G06K 9/00429
                                              382/189
7,653,818 B2   1/2010 Serpa
                    (Continued)

FOREIGN PATENT DOCUMENTS

CN        101447872    6/2009
CN        106471512 A  3/2017
            (Continued)

OTHER PUBLICATIONS

Written Opinion of the International Searching Authority for PCT/EP2015/001334 dated Sep. 4, 2015 (Form PCT/ISA/237).
International Search Report for PCT/EP2015/001334 dated Sep. 4, 2015 (Form PCT/ISA/210).
(Continued)

*Primary Examiner* — Shawnchoy Rahman
(74) *Attorney, Agent, or Firm* — Finnegan, Henderson, Farabow, Garrett & Dunner, LLP

(57) ABSTRACT

A method for initiating a login of a user into a system, the login being passed by inputting a username into a username field, inputting a password into a password field, and verifying whether the inputted username is stored by the system and whether the inputted password is a stored password corresponding to the inputted username. The method can include the system requiring during inputting character by character of the username and/or the password in addition waiting a predefined delay and/or inputting at least one character at at least one position within a character sequence of the username and/or the password, respectively, wherein the at least one character differs from the character of the username at the at least one position when inputting the username and/or differs from the character of the password at the at least one position when inputting the password.

19 Claims, 5 Drawing Sheets

(56) References Cited

U.S. PATENT DOCUMENTS

| | | |
|---|---|---|
| 8,281,147 B2 | 10/2012 | Florencio et al. |
| 8,495,732 B2 | 7/2013 | Guenthner |
| 2002/0144158 A1* | 10/2002 | Hekimian ............... G06F 21/46 726/5 |
| 2005/0149762 A1 | 7/2005 | Smith et al. |
| 2005/0273624 A1 | 12/2005 | Serpa |
| 2006/0271790 A1 | 11/2006 | Chen |
| 2007/0300077 A1 | 12/2007 | Mani et al. |
| 2008/0256086 A1 | 10/2008 | Miyoshi et al. |
| 2008/0317239 A1 | 12/2008 | Gilzean et al. |
| 2013/0067546 A1* | 3/2013 | Thavasi ................. G06F 21/32 726/7 |
| 2016/0371476 A1* | 12/2016 | Turgeman ............... G06F 21/31 |

FOREIGN PATENT DOCUMENTS

| | | |
|---|---|---|
| EP | 0155054 A2 | 9/1985 |
| EP | 1209551 A2 | 5/2002 |
| GB | 2454944 A | 5/2009 |

OTHER PUBLICATIONS

International Business Machines Corporation, "Servlet/AppletJHTML authentication process with single sign-on", Research Disclosure, Mason Publications, Hampshire, GB, vol. 429, No. 128, Jan. 1, 2000.

"Os X Mountain Lion: Prevent accidental keystrokes using Slow Keys" Nov. 23, 2012.

Partial European Search Report for EP 14 00 2411 dated Sep. 24, 2014.

* cited by examiner

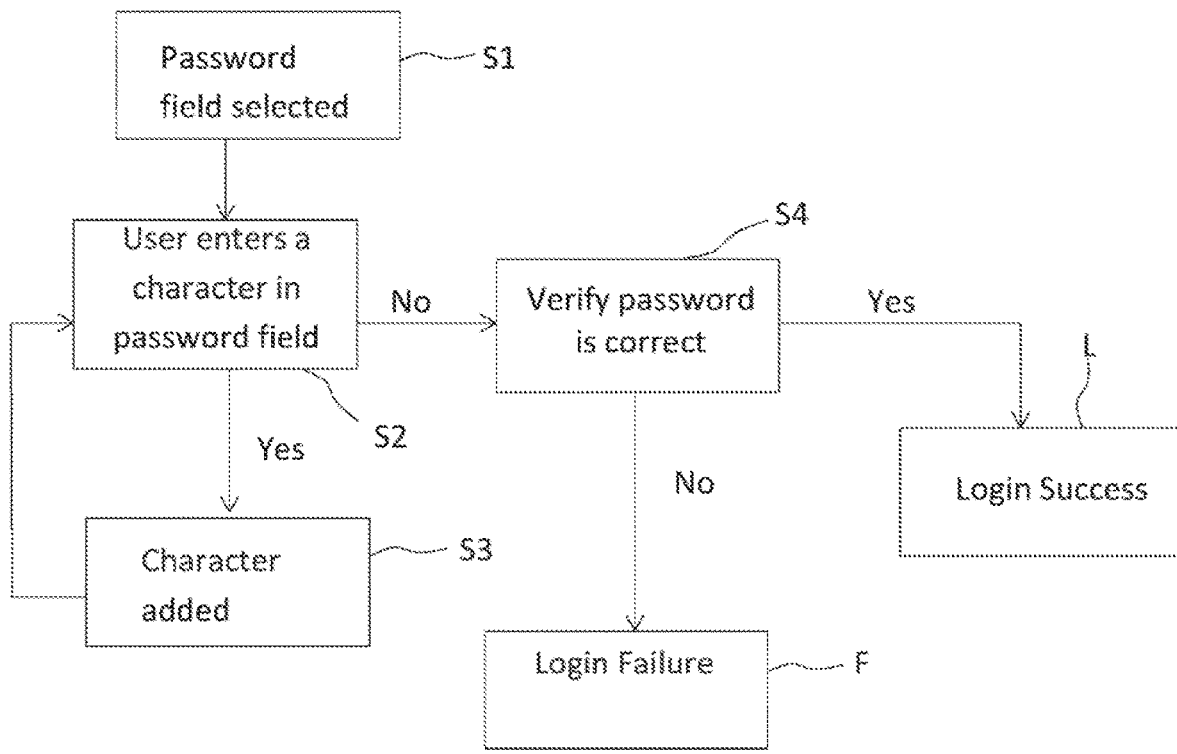
FIG. 1a  State of the art
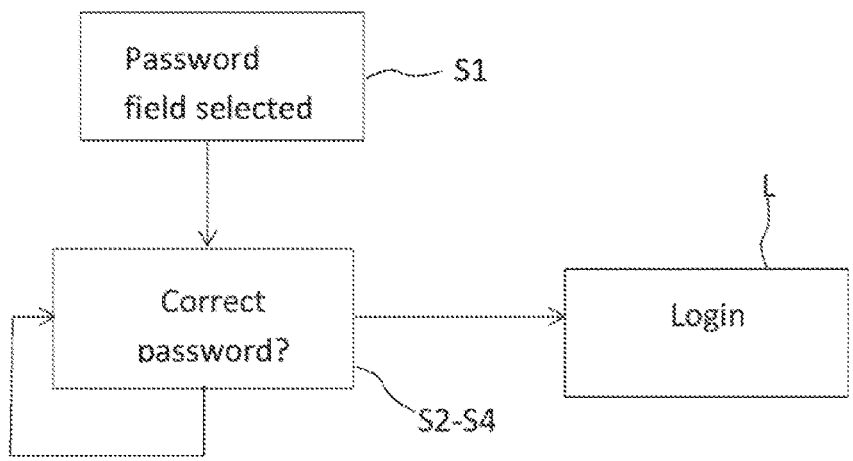
FIG. 1b  State of the art

METHOD AND SYSTEM FOR INITIATING A LOGIN OF A USER

CROSS-REFERENCE TO RELATED APPLICATIONS

This application is a continuation application of U.S. patent application Ser. No. 15/325,559, which is the United States national stage under 35 U.S.C. § 371 of PCT International Patent Application No. PCT/EP2015/001334, filed on Jul. 1, 2015, and claiming priority to European Patent App. No. 14002411.8, filed on Jul. 11, 2014.

BACKGROUND OF THE INVENTION

Field of the Invention

Embodiments relate to methods for initiating a login of a user into a system.

Background of the Related Art

One of the most common authentication methods in modern applications or communication systems is a login form usually comprising a username field, a password field and a login button. Passwords are a common authentication method used in various login forms. Frequently, users type their passwords very fast since they are familiar with the respective character sequence. This fact may lead to invalid password typing and login rejection. In other cases, malicious users try to gain access to another user's account by quickly typing various password guesses in the respective login form.

The problem of password errors due to typing speed is not addressed in any login form or login system in general. The problem of sequential password guesses is addressed in some cases by introducing a limit in login attempts. After this limit is passed the account is locked or further user actions are needed. However, such methods leave the malicious user free to attempt a few fast login attempts before the limit is reached.

The most common way hackers are using for stealing passwords is key logging. This is an application which enables them to log everything of an unsuspected user that types a sensitive combination of characters. In addition, there are other ways than key loggers for stealing passwords, like looking at ethereal traces, etc.

Till now key loggers were very effective in acquiring passwords and other useful information, like credit card numbers, etc., from innocent people. One method commonly used from user side is copy and paste username and passwords from specific programs such as PasswordSafe, etc. These programs store all keys and credentials and by simply right clicking to one of them user can copy username or password without even watching it and transfer it on the browser or application that requests these data. Also there are login prompts that present an interactive keyboard so that the user will be in position to actually type the password.

BRIEF SUMMARY OF THE INVENTION

Embodiments relate to methods for initiating a login of a user into a system, the login being passed by inputting a username into a username field, inputting a password into a password field, and verifying whether the inputted username is stored by the system and whether the inputted password is a stored password corresponding to the inputted username.

Embodiments may prevent mistakes in password typing and to make password guessing more difficult for malicious user. Embodiments may confuse and to prevent malicious attacks for encrypting password during typing.

By fact that the system requires during inputting character by character of the username and/or the password in addition waiting a predefined delay and/or inputting at least one character at at least one position within a character sequence of the username and/or the password, respectively, wherein the at least one character differs from the character of the username at the at least one position when inputting the username and/or differs from the character of the password at the at least one position when inputting the password any mistake in password typing and malicious password guessing is detected and prevented. This functionality minimizes security issues during initiation of a user login.

BRIEF DESCRIPTION OF THE FIGURES

FIG. 1A and FIG. 1B each show a block diagram of a known method for initiating a login of a user into a system;

DETAILED DESCRIPTION OF THE INVENTION

Figure 2:
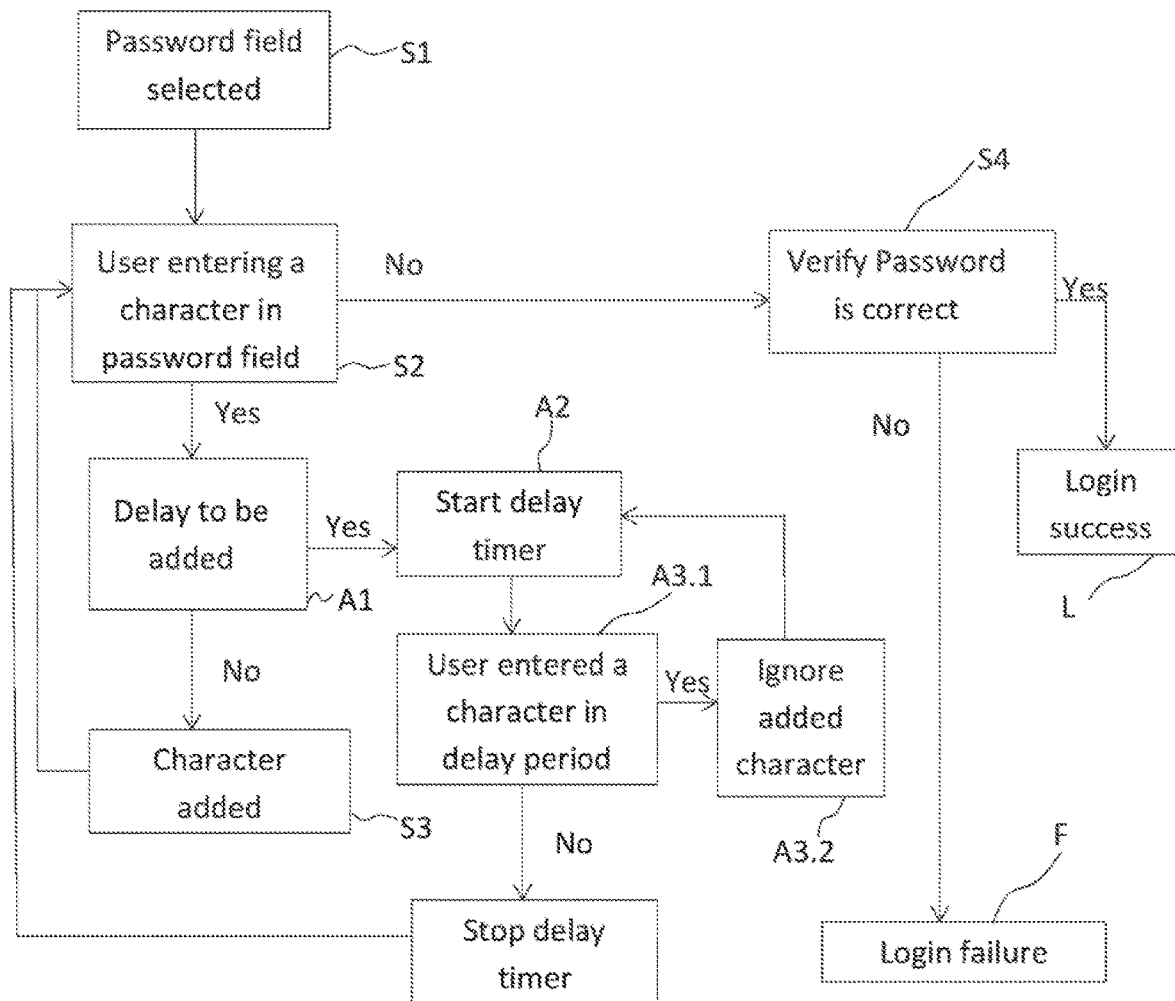
FIG. 2 shows a block diagram of a login procedure according to an embodiment of the invention.

Embodiments reported herein provide a delay mechanism used upon password characters' typing. By delaying the password typing, the probability of a typing mistake is reduced. The decision box "Is the character a correct username character" will lead in the correct state more times during password typing. Thus, via the method according to the invention invalid login attempts are reduced. Moreover, by stalling the password typing procedure, a malicious user has fewer chances to guess a password by quickly typing his guesses, especially in monitored environments.

The invention further provides a method for manually encrypting a password. Due to the password safe mechanism users can put their pin, password or any sensitive data without having the feeling of being spied. Even if a hacker gets the password is so messed up that until he deducts it the user will be notified for the false attempts and change it immediately. The method according to the invention can be applied in banking systems, web logins or high security restricted areas entrance points.

In a preferred embodiment of the invention the delay, the at least one character and/or the respective position within the username and/or the password character sequence are generated randomly by the system. In this way, an immediate inputting of username or password characters one after another is disabled and, thus, a high security level is implemented into the login mechanism.

In a highly preferred embodiment of the invention, after each time a character is inputted by the user, the system decides if a delay or any at least one character is added. This has the advantage of a high security level login and password safe mechanism.

A higher security level of the login mechanism is achieved by a preferred embodiment wherein during the delay the user input is blocked and any inserted character is ignored.

The user friendliness of the login mechanism is increased by another preferred embodiment wherein in case a delay is added the system generates an output to the user.

A further development of the method according to the invention also provides increased user friendliness. This development is characterized in that the user is notified via a visual and/or acoustic signal if he tries to input a character during the delay.

Furthermore, an output of the system can be generated when the user presses a login button and/or when the login is passed. This allows an immediate feedback to the user in case login is finished and successful, respectively.

A secure and user-friendly login service is provided by an embodiment of the invention wherein the at least one character to be inputted in addition is displayed, in particular shown on a screen, to the user.

In a preferred embodiment of the invention during the request the user input is blocked from entering any other character than the one displayed. In this way an accidental input of any non-requested character is detectable and therefore preventable.

Increased user friendliness and minimized risk of input errors are provided by an embodiment wherein in case the user has typed a character before blocking is initiated this character is stored by the system as the real username character and/or password character and held until the user presses OK.

In a preferred embodiment of the invention the at least one character and/or the respective position within the username and/or password character sequence are generated by the system according to at least one rule, in particular taking into account the preceding part of the username and/or password. The advantage is to introduce a new method for password safe mechanism with characters actually planting non-existent but relevant to the password's contents for better encryption and anti-key logging attacks.

In a highly preferred embodiment of the invention the respective rule comprises

Adding a random number after a number, or

Evaluating previous typed characters against a dictionary and if the word is noun adding 's' or if the word contains a name adding a character or a digraph which changes its gender or gives a nickname meaning, or Adding '7', '8', '9' or '0', '1' respectively after one or two symbols if '19' or '20' is found, or Adding a specific consonant after a vowel, like adding a 'n' after 'o' s or 'i's, or Adding a 'ng' after an I, or Adding an 's' after 'e', or Adding non alphanumeric characters at the end or the beginning of the password.

Also within the scope of the invention is a system, comprising a username field for input of a username, a password field for input of a password, a storage unit for storing of the username and the password, a login unit for verification of an inputted username and an inputted password in comparison with the stored username and the password corresponding to the stored username, the system being configured such that the login unit is able to require during inputting of the username and/or the password in addition waiting a predefined delay and/or inputting at least one character at at least one position within a character sequence of the username and/or the password, respectively, wherein the at least one character differs from the character of the username at the at least one position when inputting the username and/or differs from the character of the password at the at least one position when inputting the password.

In a preferred embodiment of the system the username field and the password field are integrated into an interface, like a display or a touch screen.

Embodiments may further include an electronic device, in particular a smartphone or a tablet, with a system according to the invention.

Further features and advantages of the invention are disclosed by the enclosed drawing and the corresponding description. The features mentioned above and below can be used in accordance with the invention either individually or collectively in any combination. The embodiments mentioned are not to be understood as exhaustive enumeration but rather have exemplary character for the description of the invention.

FIG. 1A illustrates a method known from state of the art for initiating a login of a user into a system. In a first step s1 a password field is selected by a user. In a second step s2 the system verifies whether the user enters a character into the password field. In case of YES the character is added to the password string in a third step s3. As long as the verification result is YES and the user input goes on steps s2 and s3 are repeated. In case of NO wherein typically the user presses the login button the system verifies whether the password is correct in a fourth step s4 and it succeeds either login fail F or login success L.

In FIG. 1A the problem of password error due to typing speed is described. If the user types the password characters fast in steps s2 and s3 there is big probability that a wrong character will be pressed. In this case the login procedure will certainly fail in step F.

The problem of speed password guessing is described in FIG. 1B. FIG. 1B differs from FIG. 1A in that login procedure comprising steps s2-s4 is repeated in case of password retry until input of correct password and successful login L. A malicious user may repeat the whole login procedure according to FIG. 1A many times and have more chances to succeed a login L to a victim's account.

A login procedure comprising the security mechanism according to the invention is illustrated by FIG. 2. The method stalls password typing by way of additional steps A1 to A4 between second S2 and third step S3 of login procedure. In a first additional step A1 after each character pressed by the user the system decides if a delay will be added. In case of NO the character is added to the password string in the third step S3. The decision of additional step A1 is made according to the configuration previously performed by the system administrator. The frequency and duration of the delay are defined by probabilities and may differ from system to system.

Figure 3:
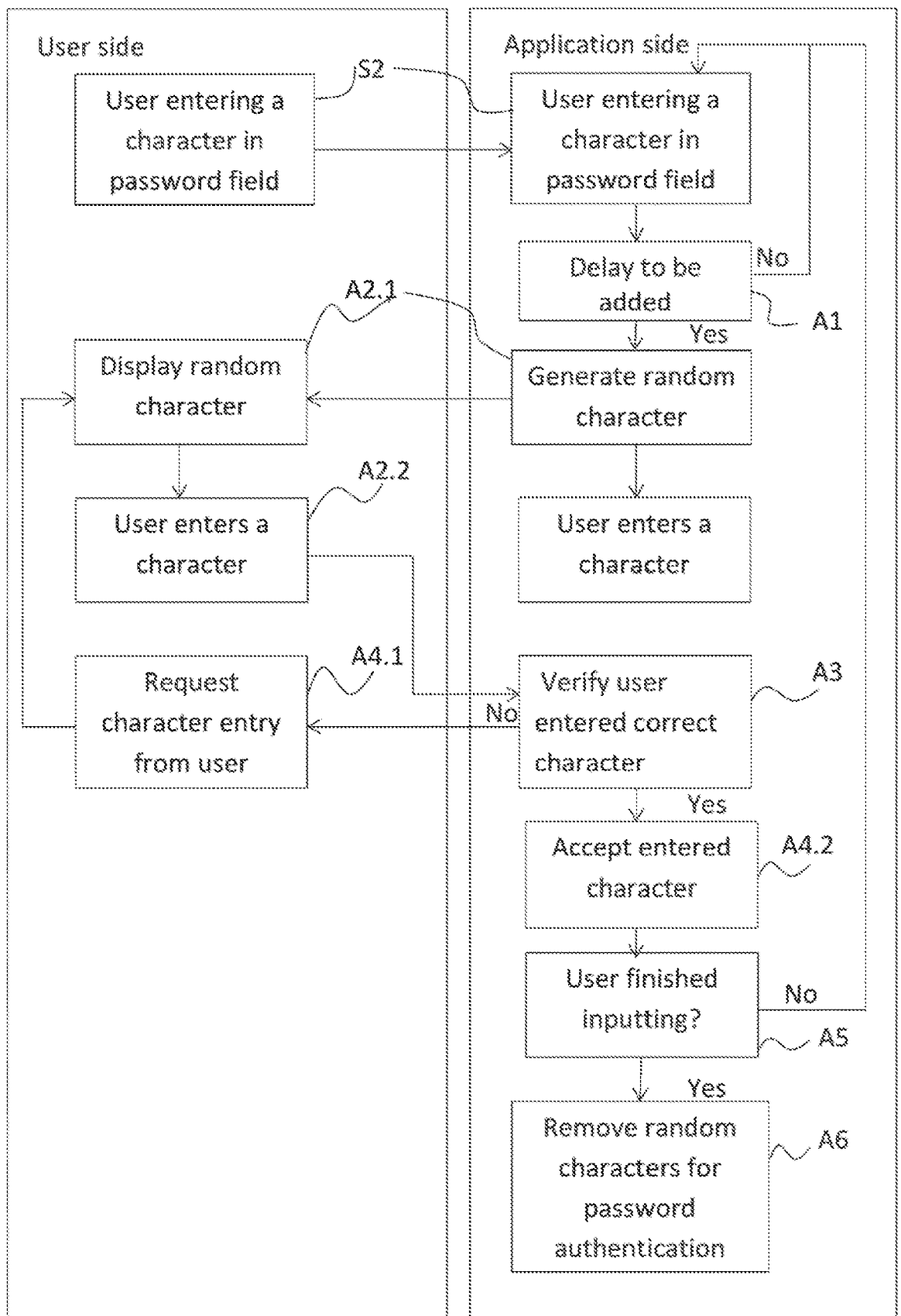
FIG. 3 shows a block diagram of a password safe mechanism according to an embodiment of the invention.

In case of YES a delay timer starts in a second additional step A2 and ends in a fourth additional step A4. During the delay, the user input is blocked. In a third additional step A3.1 between second and fourth additional steps A2 and A4 the system verifies whether the user has inserted a character into the password field during the delay. In case of user input during delay an optical and/or audio signal is generated and the character is ignored in additional step A3.2. The user is notified via a visual and acoustic signal if he tries to press a character during the delay. In this case the character will have to be inserted again by the user in step S2 succeeding additional step A4, i.e. after the delay ends. Another security mechanism according to the invention for login procedures is illustrated by FIG. 3 wherein user side is shown on the left and application/system side on the right. In second step S2 user types a character read by the system. In the first additional step A1 after each character typed by the user the system decides whether a new random character is required. In case of YES the system generates randomly a character, e.g. 'Y', displayed at user side in the second additional step A2.1. The user types a character in additional step A2.2 wherein the system blocks any other non-identical character to be typed.

In the third additional step A3 the system verifies whether the user typed the correct character, e.g. 'Y'. In case of NO the system deletes from frontend the mistyped character in additional step A4.1 and goes back to display of the requested character at user side in additional step A2.1. In case of YES the systems allows all characters to be accepted again in additional step A4.2. In fifth additional step A5 the system verifies whether the user has finished his input, e.g. by pressing the button OK. In case of NO the system is brought back to the beginning of the security mechanism at step S2 on application side. In case of YES a sixth additional step A6 succeeds wherein the system removes the random character, e.g. 'Y', from password authentication and proceeds with authentication according to step S4.

In the illustration of FIG. 3 it can easily be seen that when user types the password, at random point in time, application/system generates a random character on his screen, step A2.1, and blocks him from entering other character than the one shown, step A2.2. On successful entry user is allowed to type the rest of the password, steps A6, S2. This process can be repeated depending on the application, for better security this process can be repeated above 4 times so that the password is well hidden having random non correct characters in it.

Figure 4:
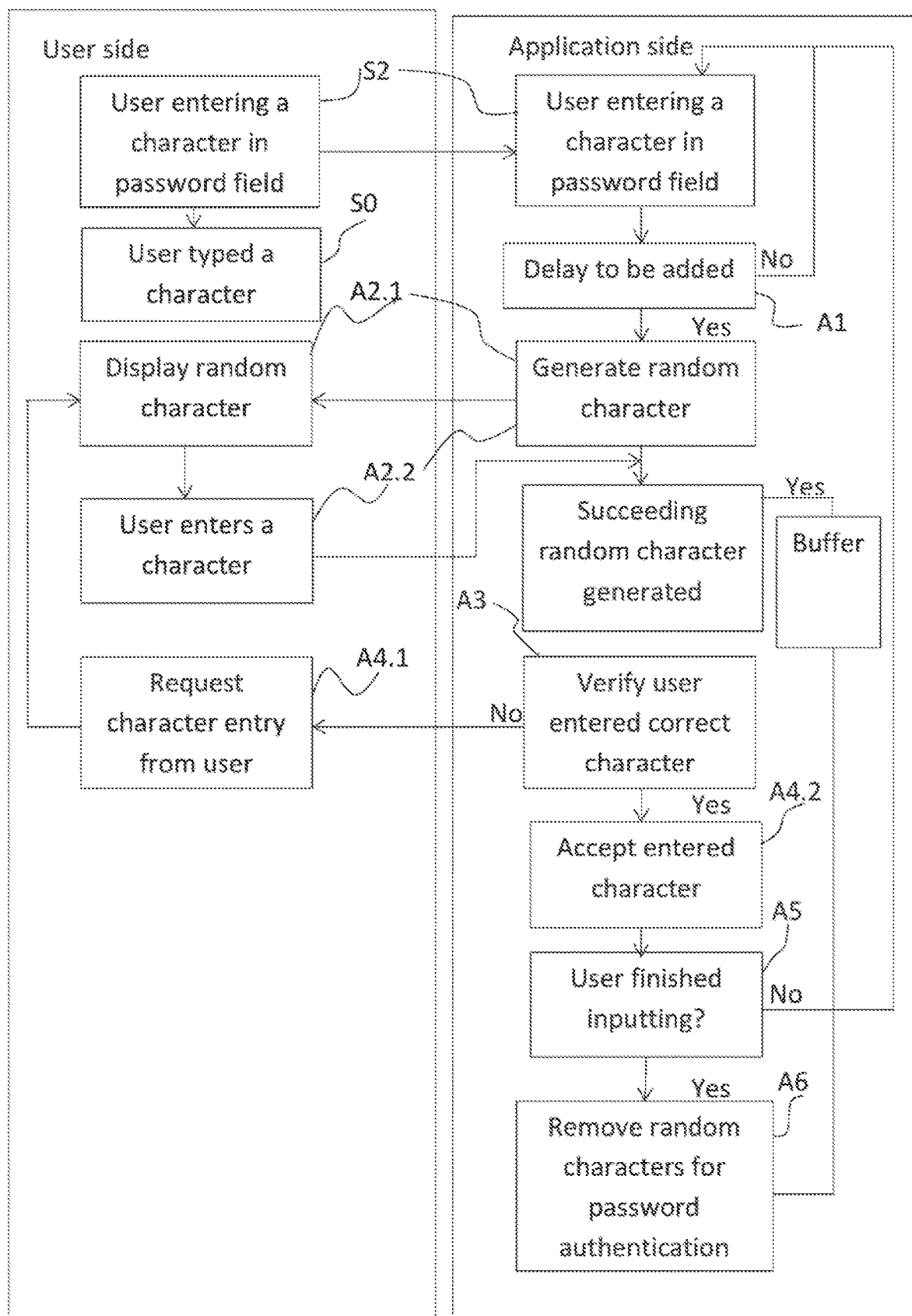
FIG. 4 shows a block diagram of another password safe mechanism according to an embodiment of the invention.

FIG. 4 illustrates a fast typing protection and differs from FIG. 3 in that according to preceding step S0 the user has typed a character before blocking is initiated by the system. In case said character is received by the system in additional step A2.3 succeeding random character generation and user input blocking according to additional steps A2.1, A2.2, the character is put into buffer B. During finishing sixth additional step A6 the buffered character is re-inserted by the system into the login procedure.

In FIG. 4 a more sophisticated approach is attempted taken into consideration the fact that the system and application, respectively, is on the internet and the requests/responses can take time. The security mechanism illustrated in FIG. 4 can have the negative effect that fast users will type a character that essentially is not the one requested by the application, before application really blocks them requesting the intervened character. In the illustration of FIG. 4 it can be seen that in such case this characters are stored as real password characters in buffer B and will be held from server side until user presses OK. In such case these characters are in their respective username or password positions.

Figure 5:
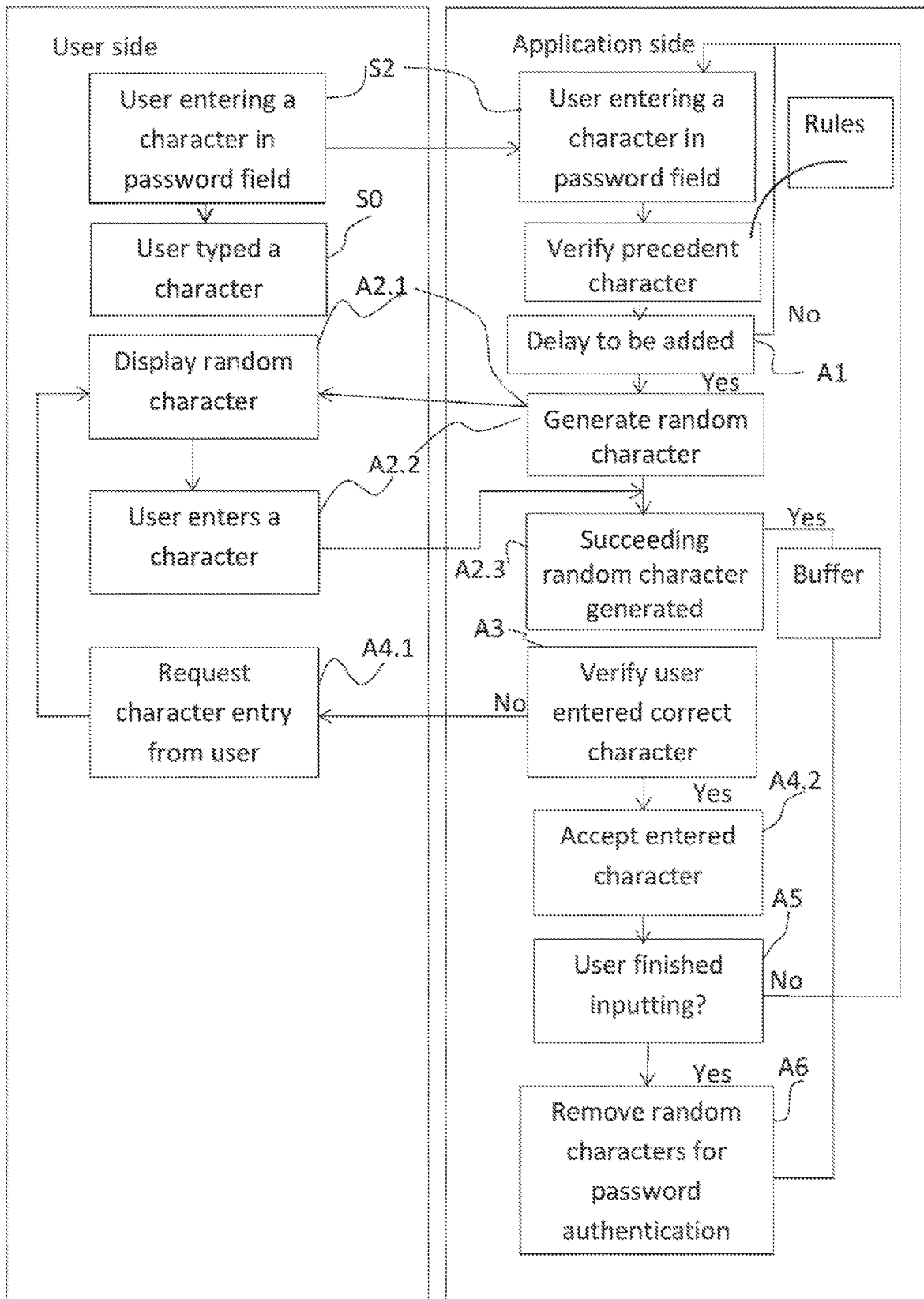
FIG. 5 shows a block diagram of another password safe mechanism according to an embodiment of the invention.

FIG. 5 illustrates an enhanced functionality of related letters mechanism and differs from FIG. 4 in that according to preceding additional step A0 between steps S2 and A1 the system verifies whether the precedent character or combination is in one of the rules. Thereby the system makes use of a dictionary and set of rules R.

A technical feature or several technical features which has/have been disclosed with respect to a single or several embodiments disclosed herein before, e. g. starting a delay timer in FIG. 2, may be present also in another embodiment, e. g. generating randomly a character and blocking a user from other entry in FIGS. 3, 4, and 5, except it is/they are specified not to be present or it is impossible for it/them to be present for technical reasons.

The invention claimed is:

1. A method for initiating a login of a user into a system, the method comprising:
providing an interface for receiving from the user input characters, the input characters corresponding to a username defined by a username character sequence and/or a password defined by a password character sequence wherein the username character sequence is input into a username field, and the password character sequence is input into a password field;
configuring the interface to require the user to wait a delay time period to continue entering characters of the username character sequence into the username field and/or require the user to wait the delay time period to continue entering characters of the password character sequence into the password field during a pre-selected delay time period before an entirety of the username and/or an entirety of the password is entered;
configuring the interface to require input of a pre-selected character into the username field and/or the password field at at least one position, the pre-selected character differing from a character of the username and/or the password so that a fully entered password within the password field differs from the password of the user and/or a fully entered username within the username field differs from the username of the user;
displaying to the user the pre-selected character required to be input during the delay time period; and
in response to the displayed pre-selected character being input into the username field and/or the password field during the delay time period, permitting user continued entering of the characters of the username character sequence into the username field and/or continued entering of the characters of the password character sequence into the password field.

2. The method of claim 1, further comprising verifying whether the username is stored by the system and whether the password is a stored password corresponding to the input username, the verifying occurring such that each and every pre-selected additional character that is inserted during the blocking of the entering of the character into the username field and/or the password field during the delay time period is ignored to authenticate the username and/or the password.

3. The method of claim 1, further comprising verifying whether the username is stored by the system and whether the password is a stored password corresponding to the input username, the verifying occurring such that each and every pre-selected additional character that is inserted during the blocking of the entering of the character into the username field and/or the password field during the delay time period is removed to authenticate the username and/or the password.

4. The method of claim 1, further comprising randomly generating, by the system, each of the at least one pre-selected additional character to be entered during the delay time period.

5. The method of claim 1, further comprising, after each time a character is input by the user, the system deciding if a delay or at least one pre-selected additional character is to be added.

6. The method of claim 1, further comprising ignoring inserted characters during the delay time period unless the inserted character is the at least one pre-selected additional character.

7. The method of claim 1, further comprising generating an output to the user when the delay time period is added to inform the user of the delay time period.

8. The method of claim 1, further comprising notifying the user via at least one of a visual signal and an acoustic signal when the user tries to input a character during the delay time period.

9. The method of claim 1, further comprising generating an output from the system in response to the user pressing a login button.

10. The method of claim 1, comprising generating an output from the system in response to login being initiated.

11. The method of claim 9, further comprising, upon a determination by the system that the user has typed a character into the username field or the password field before blocking was initiated and after a character was entered into the username field or the password field that triggered initiation of the blocking, storing the typed character as a real username character or a real password character and holding the typed character until the user enters a required pre-selected additional character during the delay time period.

12. The method of claim 1, further comprising generating the at least one pre-selected additional character to be inserted during the delay time period at a respective position within the username character sequence and/or the password character sequence by the system according to at least one rule, wherein said rule takes into account a preceding part of the username or a preceding part of the password.

13. The method of claim 1, further comprising:
generating the at least one pre-selected additional character to be inserted during the delay time period at a respective position within the username character sequence and/or the password character sequence by the system according to at least one rule, wherein said rule takes into account a preceding part of the username and/or a preceding part of the password, wherein the rule is selected from the group consisting of:
adding a random number after a number;
evaluating previous typed characters against a dictionary and, if a word is a noun adding 's' or if the word contains a name adding a character or a digraph that changes the names gender or gives a nickname;
adding '7', '8', '9', '0', or '1' respectively after one or two symbols if '19' or '20' is found;
adding a specific consonant after a vowel;
adding an 'ng' after an 'i';
adding an 's' after 'e';
adding non-alphanumeric characters at an end of the password and/or the username; and
adding non-alphanumeric characters at a beginning of the password and/or the username.

14. A system comprising:
at least one of: a username field for input of an input username and a password field for input of an input password;
a non-transitory computer readable medium that stores a stored username and a stored password associated with the stored username;
the system configured to:
require the user to wait for a pre-selected delay time period prior to continue entering characters of a username character sequence into the username field and/or a password character sequence into the password field during the pre-selected delay time period before an entirety of the stored username and/or an entirety of the stored password is entered,
require the user to input a pre-selected character into the username field and/or the password field at least one position, the pre-selected character differing from a character of the stored username and/or the stored password so that a fully entered password within the password field differs from the stored password and/or a fully entered username within the username field differs from the stored username, wherein the pre-selected character is displayed via a display during the pre-selected delay time period;
in response to the displayed pre-selected character being input into the username field and/or the password field, continued entering of the characters of the username character sequence into the username field and/or continued entering of the characters of the password character sequence into the password field is permitted.

15. The system of claim 14, wherein the username field and the password field are integrated into a displayable interface.

16. The system of claim 14 being part of an electronic device.

17. The electronic device of claim 16, wherein the electronic device is a tablet, a telephone or a smart phone.

18. The system of claim 14, wherein each pre-selected additional character is generated by the system in accordance with a pre-selected set of rules, the pre-selected set of rules including one or more of:
adding a random number after a number;
evaluating previous typed characters against a dictionary and, if a word is a noun adding 's' or if the word contains a name adding a character or a digraph that changes the names gender or gives a nickname;
adding '7', '8', '9', '0', or '1' respectively after one or two symbols if '19' or '20' is found;
adding a specific consonant after a vowel;
adding an 'ng' after an 'i';
adding an 's' after 'e';
adding non-alphanumeric characters at an end of the password; and
adding non-alphanumeric characters at a beginning of the password.

19. The system of claim 14, wherein the system is or includes a smart phone or a tablet.

* * * * *

UNITED STATES PATENT AND TRADEMARK OFFICE
CERTIFICATE OF CORRECTION

| | |
|---|---|
| PATENT NO. | : 11,068,568 B2 |
| APPLICATION NO. | : 16/506076 |
| DATED | : July 20, 2021 |
| INVENTOR(S) | : Vasileios Giatilis et al. |

It is certified that error appears in the above-identified patent and that said Letters Patent is hereby corrected as shown below:

On the Title Page

Item (30) Foreign Application Priority Data, "14002411" should read as --14002411.8--.

Signed and Sealed this
Seventeenth Day of May, 2022

Katherine Kelly Vidal
*Director of the United States Patent and Trademark Office*